Figure 1:
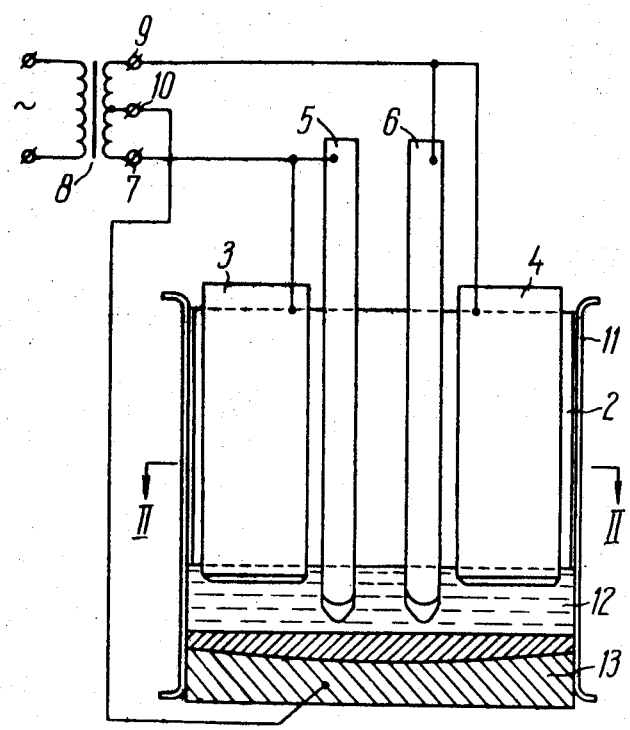

United States Patent

[11] 3,578,938

[72] Inventors Boris Izailevich Medovar
Bulvar Lesi Ukrainki, 2, kv. 8;
Daniil Andreevich Dudko, pereulok
Mechnikova, 3, kv. 7; Vitaly Mikhailovich
Baglai, ulitsa Semanshko, 10, kv. 54/3;
Oleg Petrovich Bondarenko, Kreschatik,
15, kv. 34; Albert Nikolaevich Sevruk,
ulitsa Ezhena Potie, 9, kv. 89; Rudolf
Solomonovich Dubinsky, Brest Litovsky
prospekt, 11, kv. 15; Vladimir
Prokhorovich Andreev, ulitsa B.
Kitaevskyaa, 99, kv. 13; Georgy
Grigorievich Andrianov, Bulvar Lenina,
30, kv. 26; Valentin Stepanovich Sindeev,
Bulvar Druzhby Narodov, 14, kv. 13;
Anatoly Nikolaevich Safonnikov, ulitsa
Filatova, 1/22, kv. 78; Igor Ivanovich
Suschuk-Sljusarenko, ulitsa Vyborgskaya,
80/17, kv. 94, Kiev, U.S.S.R.
[21] Appl. No. 814,399
[22] Filed Apr. 8, 1969
[45] Patented May 18, 1971
[32] Priority Apr. 8, 1968
[33] U.S.S.R.
[31] 1231246

[54] METHOD OF ELECTROSLAG WELDING
5 Claims, 2 Drawing Figs.

[52] U.S. Cl. ............................................. 219/73,
219/137
[51] Int. Cl. ............................................. B23k 9/18
[50] Field of Search ............................................. 219/73,
121, 126, 130, 137

[56] References Cited
UNITED STATES PATENTS
| | | | |
|---|---|---|---|
| 3,291,955 | 12/1966 | Shrubsall et al. | 219/73 |
| 3,170,430 | 2/1965 | Bistak | 219/73 |
| 3,211,887 | 10/1965 | Cotterman | 219/73 |
| 3,243,568 | 3/1966 | Burden | 219/73 |
| 3,431,385 | 3/1969 | Santilhano | 219/73 |

Primary Examiner—A Bartis
Assistant Examiner—Lawrence A. Rouse
Attorney—Waters, Roditi, & Nissen ABSTRACT: A method of electroslag welding, enabling metal parts of great thickness to be welded together, wherein stationary and movable consumable electrodes are disposed equidistantly in relation to the surfaces of parts to be welded together, the movable electrodes being rigid and not bendable along the weld seam being made as they are immersed into a slag bath.

METHOD OF ELECTROSLAG WELDING

The present invention relates to methods of electroslag welding of metal parts and structures.

Methods of electroslag welding are widely known in the prior art, comprising placing consumable electrodes into a gap between the surfaces of parts to be welded together, creating a slag bath, immersed into which are the ends of the consumable electrodes, and passing electric current through the electrodes, slag bath and the parts to be welded.

Parts of the consumable electrodes is thereby continuously fed into the slag bath, so that they are melted in the gap provided between the surfaces of parts to be welded together, the parts being fused, while the slag bath displaced upwardly.

When the said gap is being filled with drips of molten metal dripping from both movable and stationary electrodes and passing through the slag bath, the metal of a weld seam solidifies, thus forming together with the fused metal of the parts being welded a welding joint.

Such methods are generally employed for welding parts having large areas of the surfaces to be welded together. In these processes, stationary electrodes are metal plates 6 to 8 mm. thick, whereas movable electrodes are wires 3 to 5 mm. in diameter to be fed into the slag bath through channels provided in the metal plates.

The welding wires are arranged at a distance not more than 100 mm. for each other. When welding parts having great thickness, for example, up to 1,500 mm., a great number of such wires is required (up to 16 pieces), as well as complicated devices for feeding them into the slag bath.

When simultaneously feeding a great number of such wires, they can be stopped in the channels of these metal plates, which is conducive to the formation of welding defects.

It is an object of the present invention to provide such a method of electroslag welding, which will permit welding metal parts of great thickness, making high-quality welded joints, and applying relatively simple equipment for attaining the above-mentioned arms.

The above and other objects are accomplished owing to the fact that when welding metal parts, according to the invention, all the consumable electrodes are disposed in a row equidistantly with regard to the surfaces of the parts being welded together, and a slag bath is created, subsequent to which at least one of the said electrodes is continuously fed into the slag bath. In this process, employed as movable electrodes are those which do not bend along the weld seam being made. The stationary electrodes should be disposed near the lateral edges of the parts to be welded together, whereas the movable electrodes should be fed between the stationary electrodes.

Figure 2:
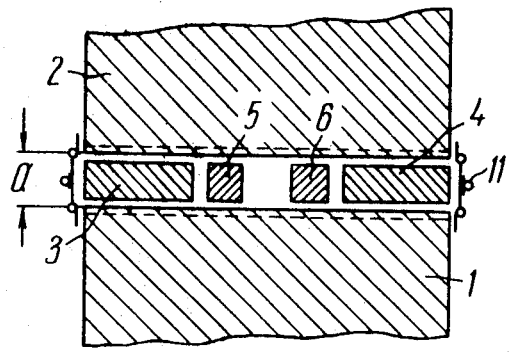

The method of this invention will become more clearly understood from the following detailed description of one specific embodiment of the invention, taken in conjunction with the accompanying drawings, in which:

FIG. 1 is a front view partly in section of an arrangement of consumable electrodes in the gap provided between the surfaces of the parts to be welded together; and FIG. 2 is a cross-sectional view taken on line II-II of FIG. 1.

Parts 1 and 2 (FIGS. 1 and 2) to be welded are made of steel containing 0.25 percent of carbon, and have cross section of 1,500×1,500 mm. Disposed in the welding gap $a$=80 mm. equidistantly in relation to the surfaces of parts 1 and 2 to be welded together, near their lateral edges, are electrodes 3, 4 having a cross section of 450 ×60 mm; while between electrodes 3, 4 placed electrodes 5 and 6 having a cross section of 250×50 mm; the electrodes being made of steel of the same composition. The length of electrodes 3, 4 is equal to 1,700 mm; whereas that of electrodes 5, 6 is 5,000 mm. The electrodes 3 and 5 are connected to terminal 7 of the secondary winding of a single-phase transformer 8 operating on 50 c.p.s. alternating current, whereas the electrodes 4 and 6, are connected to another terminal of the same winding.

The parts 1,2 to be welded together, are connected to a middle tap 10 of the secondary winding of transformer 8. Provided on the side of the lateral edges of the surfaces to be welded together of parts 1, 2 are water-cooled backings 11.

After applying the voltage from the transformer 8 to the electrodes 3, 4, 5 and 6, liquid slag is poured into the welding gap $a$ until the lower ends of the electrodes 3, 4, 5, 6 are immersed thereinto. Then the electrodes 5 and 6 are simultaneously fed into slag bath 12, owing to which the electroslag welding process proceeded, resulting in the formation of a weld seam 13.

The arrangement of the consumable electrodes in a row equidistantly with regard to the surfaces of the parts being welded together, allows the use of movable electrodes of a large cross section and a limited length, for example, up to 5 m. long, that do not bend along the weld seam being made, e.g. within the section lying between the upper edge of the parts being welded and the slag bath. The length of the movable electrodes is adopted to be such that the amount of electrode metal is sufficient for filling up the welding gap.

Application of the large section electrodes permits the welding process to be rendered more dependable, the quality of the welded joint to be improved, and the welding equipment to be simplified.

The arrangement of the stationary electrodes at the external edges of the surfaces to be welded of the parts allows of obtaining a welded joint of good quality at these points, which is of great importance in cases of welding parts of intricate cross section.

We claim:

1. A method of electroslag welding of metal parts, said method comprising positioning a plurality to solid, consumable electrodes in a gap between the surfaces of parts to be welded together, arranging the electrodes in linear, spaced relation in a row equidistant from the surfaces to be welded, forming a slag bath at the bottom of said gap, and then continuously feeding at least one of said electrodes into the slag bath while at least one other electrode is held stationary and immersed in the bath, the electrode fed into the slag bath being rigid so as to travel unguided and without bending along the weld seam being made at said gap.

2. A method as claimed in claim 1, wherein two electrodes are fed simultaneously into the bath and two electrodes are held stationary, the two movable electrodes being positioned between the two stationary electrodes.

3. A method as claimed in claim 2, wherein said stationary electrodes are supported proximate the lateral edges of the parts to be welded together.

4. A method as claimed in claim 3, wherein the movable electrodes are initially formed with greater length than said stationary electrodes.

5. A method as claimed in claim 4 comprising connecting one movable electrode and one stationary electrode to one tap of a transformer and the other movable electrode and the other stationary electrode to another tap of the transformer.